(No Model.)
J. ORR.
ASH SIFTER.
No. 420,414. Patented Jan. 28, 1890.
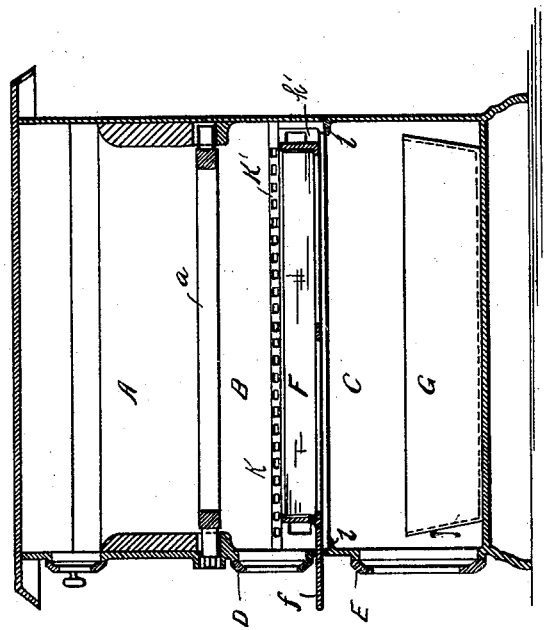
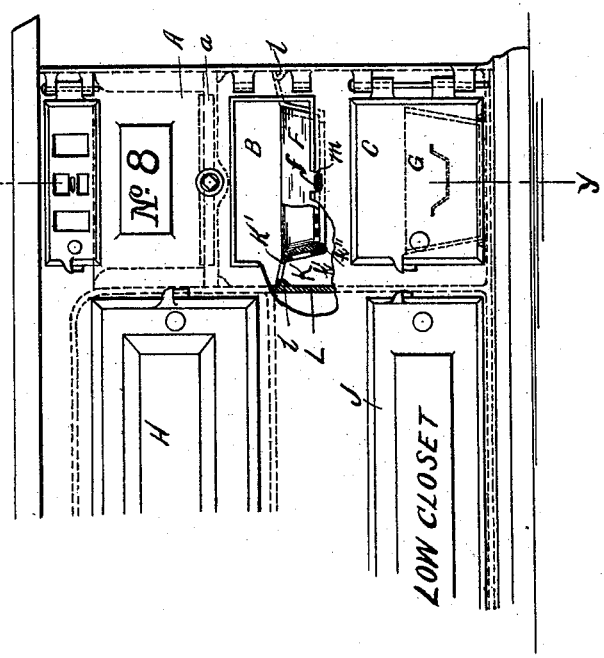
WITNESSES
INVENTOR
By Attorney

UNITED STATES PATENT OFFICE.

JESSE ORR, OF READING, PENNSYLVANIA, ASSIGNOR TO THE READING STOVE WORKS, ORR, PAINTER & CO., OF SAME PLACE.

ASH-SIFTER.

SPECIFICATION forming part of Letters Patent No. 420,414, dated January 28, 1890.

Application filed August 14, 1889. Serial No. 320,672. (No model.)

*To all whom it may concern:*

Be it known that I, JESSE ORR, a citizen of the United States, residing at Reading, in the county of Berks and State of Pennsylvania, have invented certain new and useful Improvements in Ash-Sifters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention consists in a novel arrangement of ash-sifter located between the grate and ash-pit of a stove. It is adapted more particularly to a cooking-range of the form known as the "Cabinet," and which is provided with a hot closet underneath the oven, and a fire-chamber, sifting-chamber, and ash-pit arranged one beneath the other, with the ash-pit on the same level as the hot closet.

The object of the invention is to insure the thorough sifting of everything that passes through the grate, and at the same time prevent the escape of dust and permit the withdrawal of the sifter-pan.

The invention is fully described herein and specified in the claims.

Figure 1 is a partial front view of a stove involving my invention. Fig. 2 is a sectional view through X Y of Fig. 1.

A represents the fire-chamber, B the sifting-chamber, and C the ash-chamber, arranged vertically one above the other and separated from the oven H and low closet J by the vertical interior wall L of the stove.

The grate $a$ is of a form which may be rocked or otherwise agitated without opening any of the doors, and the sifting-pan F is movably suspended immediately below it by a receptacle K, which latter is suspended from ledges $l$ on the stove-plates. This receptacle comprises the walls $k'$, from the bottom of which flanges $k''$ project inward, and it is made of such size that it will accommodate the ash-pan loosely enough to permit the same to be reciprocated and readily withdrawn, but not so loosely as to provide an appreciable space between the side walls of said ash-pan and receptacle. This sifting-pan rests on the flanges $k''$, and said receptacle is suspended (by means of flanges K', which project outward from its top) clear of the walls of the sifting-chamber from ledges $l$, formed on the stove-plate. These flanges K' and the walls of the receptacle are preferably perforated or slotted, so as to serve as stationary sieves, upon which the ashes fall from the sides of the grate, and said flanges incline toward the body of said receptacle, so as to direct thereinto any ashes, coal, or cinders which fail to pass through their perforations. The sifting-pan is obviously below the level of the flanges K', and is of such a width that it may be readily removed when the door D is opened, yet none of the ashes which fall through the grate can reach the ash-chamber without being sifted, and the pan F will hold all that fails to pass through to the lower chamber. The handle $f$ of the sifting-pan projects through an opening $m$ in the stove-plate immediately under the door D, the opening or closing of which door is not interfered with, however, and the pan is moved back and forth by means of the projecting handle while the doors are closed, and may be easily removed after the dust has settled by opening the door D. There will be no escape of dust into the room during the operation of shaking or sifting.

The ash-pan G may be removed in the usual manner by opening the door E.

I am aware that sifters have heretofore been applied to stoves in such a manner as to intercept the ashes from the fire-chamber, and also that it is not new to support sifters so located by means of slotted bearing-plates. Such constructions I therefore do not broadly claim as my invention; but What I do believe to be new and desire to secure by Letters Patent, and what I therefore claim, is—

1. A stove having a sifting-chamber located between the grate and ash-chamber, in combination with an open-bottomed receptacle within said sifting-chamber, said receptacle having inwardly-projecting flanges at its lower end and outwardly-projecting flanges at its upper end, said outwardly-projecting flanges serving to suspend said receptacle clear of the walls of the sifting-chamber and perforated to form fixed sieves, and a sifting-pan located within said receptacle and resting on the flanges at the bottom thereof.

2. A stove having a sifting-chamber located between the grate and ash-chamber and provided with a door, and also with ledges formed on the stove-plate, in combination with an open-bottomed receptacle within said sifting-chamber, said receptacle having inwardly-projecting flanges at its lower end and outwardly-projecting flanges at its upper end, said outwardly-projecting flanges serving to suspend said receptacle from the ledges on the stove-plate and perforated to form fixed sieves, and a reciprocatory sifting-pan removably located within said receptacle and having a handle projecting to the exterior of the stove, all substantially as shown, and for the purposes set forth.

3. A stove having a sifting-chamber located between the grate and ash-chamber, in combination with an open-bottomed receptacle within said sifting-chamber, said receptacle having inwardly-projecting flanges at its lower end and outwardly-projecting flanges at its upper end, said outwardly-projecting flanges inclining toward the body of said receptacle, serving to suspend the same clear of the walls of the sifting-chamber, and perforated to form fixed sieves, and a sifting-pan located within said receptacle and resting on the flanges at the bottom thereof.

In testimony whereof I affix my signature in presence of two witnesses.

JESSE ORR.

Witnesses:
W. B. WEAVER,
F. M. BANKS.